J. H. SWIHART.
AUTOMATIC SCALE.
APPLICATION FILED NOV. 25, 1907.
No. 906,960.
Patented Dec. 15, 1908.
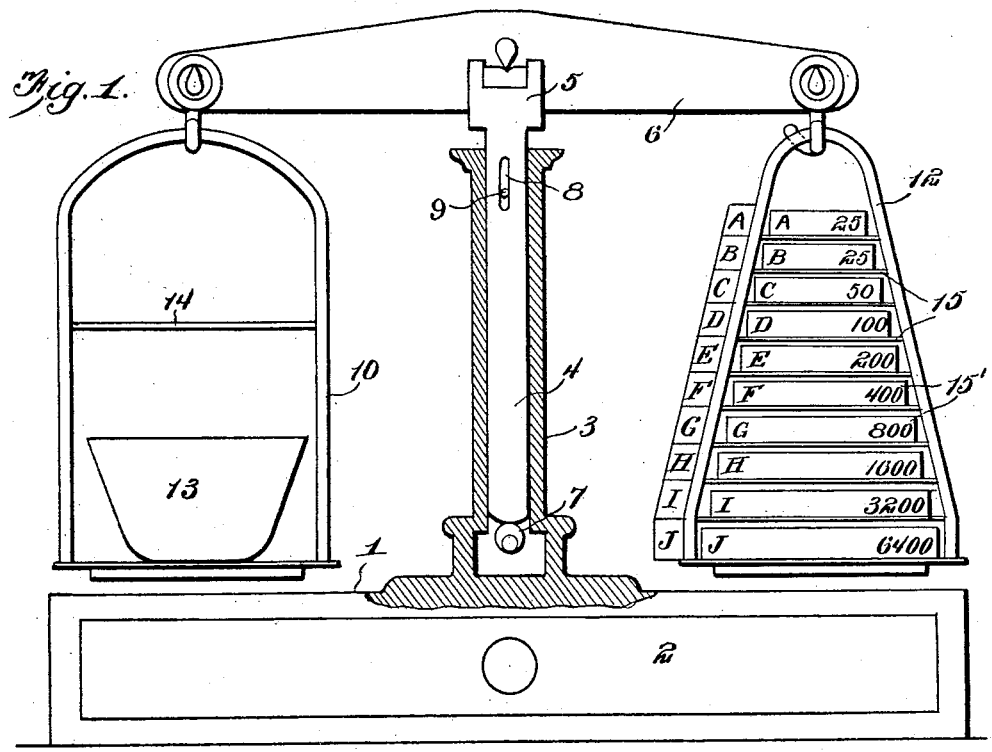
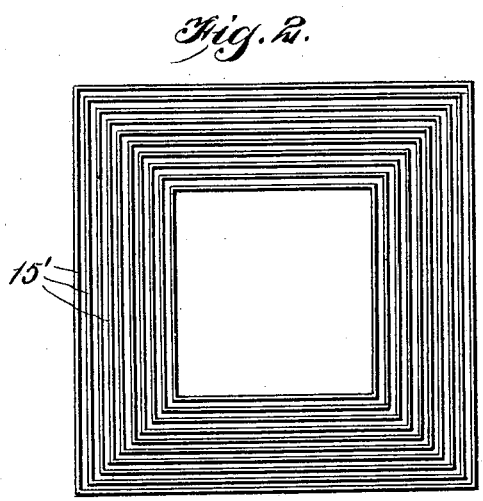
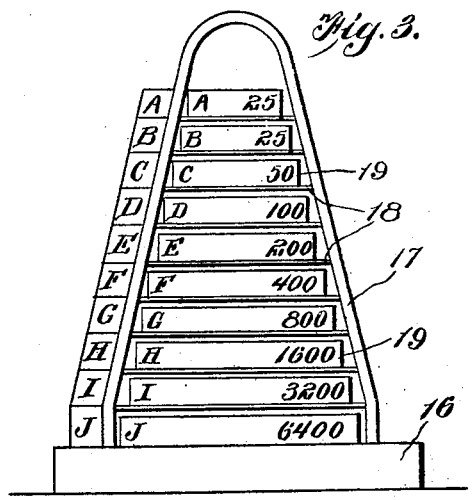
Witnesses
Inventor
John H. Swihart
By H. R. Wilson & Co.
Attorneys

UNITED STATES PATENT OFFICE.

JOHN HENRY SWIHART, OF BEAVER FALLS, PENNSYLVANIA.

AUTOMATIC SCALE.

No. 906,960.  Specification of Letters Patent.  Patented Dec. 15, 1908.

Application filed November 25, 1907.  Serial No. 403,777.

*To all whom it may concern:*

Be it known that I, JOHN HENRY SWIHART, a citizen of the United States, residing at Beaver Falls, in the county of Beaver and State of Pennsylvania, have invented certain new and useful Improvements in Automatic Scales; and I do declare the following to be a full, clear, and exact description of the invention, such as will enable others skilled in the art to which it appertains to make and use the same.

This invention relates to improvements in counting and weighing scales.

The object of the invention is to provide an even-balance counting and weighing scale by means of which goods may be weighed in pre-determined quantities or lots, each lot containing the same number of articles weighed.

A further object is to provide means whereby any quantity of goods or number of like objects may be quickly counted by weight and in multiples in any desired unit.

With these objects in view, the invention consists of certain novel features of construction, combination and arrangement of parts as will be described and particularly pointed out in the appended claims.

In the accompanying drawings, Figure 1 is a side elevation of a scale constructed in accordance with the invention, parts of the same being broken away and in section; Fig. 2 is a plan view of the scale pans or trays showing the same nested together; and Fig. 3 is a side elevation of a stationary stand for pans or trays employed in connection with the scale.

In the accompanying drawings is illustrated one embodiment of the invention wherein an even-balance scale is employed, said scale comprising a base, 1, which, if desired, may be provided with a drawer, 2, to contain weights. On the base 1 is secured a centrally disposed upwardly projecting standard 3, in which is adjustably mounted a pivot post, 4, on the upper end of which is formed a bifurcated head, 5, in which is pivotally mounted a balancing scale beam, 6. The post, 4, is adapted to be raised and lowered in the standard 3, by means of an eccentrically mounted disk, 7, which may be turned in any suitable manner to raise and lower the post, 4, and thereby move the scale pans into and out of engagement with the base 1. The post 4 is provided near its upper end with a vertically disposed slot, 8, in which is arranged a stop pin, 9, whereby the upward movement of the post is limited.

Connected to the outer ends of the beam 6 in any suitable manner are bails, 10, and 12. In the bail 10 is arranged a scoop or receptacle, 13, in which the goods to be weighed and counted are placed. In the bail 10 above the scoop 13 is also arranged a weight shelf, 14, the purpose of which will hereinafter appear. In the bail 12 is arranged a series of shelves, 15, which are adapted to support a series of pans or trays, 15', the size of which increase from the upper toward the lower tray, each consecutive tray, below the second one, being of a size or capacity equal to twice that of the one immediately above. The trays are preferably lettered in alphabetical order, as are also the shelves which separate the same, thereby decreasing the possibility of getting the trays on the wrong shelves. If desired, the trays may also have arranged on their upper edges or outer sides, a series of numbers which increase from the upper two trays to the lowermost tray in multiples of a given number with which the first two trays are supplied, the number on each tray below the second one, being twice that of the next tray above; the number on the third tray being twice the number on the two uppermost trays. The object of numbering the trays in this manner is to aid in the operation of the scale, as will hereinafter appear.

In the operation of the scale for the purpose of weighing and counting a quantity of goods, a predetermined number is decided upon to serve as a unit of weight. Assuming this number to be 25, as shown in the drawings, and the goods to be weighed to be screws, the operator will first count out 25 screws into the uppermost pan or tray in the bail 12. After this has been done, a quantity of screws is placed in the scoop 13 until the scale beam is balanced. The number of screws in the scoop 13 should be the same as in the upper pan, or tray, A. The screws in the scoop 13 are now emptied into the second tray or pan, B, so that we now have on the bail 12 two pans or trays each containing twenty-five screws. A quantity of screws will now be placed in the scoop 13 until the scale beam again balances, and the number of screws thus placed in the scoop should equal the number in the two upper pans A—B in the bail 12, which would be fifty. These screws in the scoop 13 are now emptied into the pan or tray C on the bail, 12, making in all one hundred screws on this side of the scale. A quantity of screws is again placed in the scoop, 13, until the beam balances, and the scoop should now contain one hundred screws, or a quantity equal to the number of screws in the three pans in the bail 12, after which the screws in the scoop 13 are emptied into the fourth pan, D, and the operation is repeated until the entire quantity of screws has thus been counted, after which the weight of the same may be ascertained by placing weights upon the shelf 14 in the bail 10 until the bail beam balances.

If it should so happen that at the end of the counting operation hereindescribed, there should remain a smaller number of screws than would balance the quantity already placed in the pans on the bail, 12, the scale will be made to balance by removing the screws from a sufficient number of the pans or trays in the bail 12, after which the number of screws in the remaining pans will be added together, which number will be equal to the number of screws in the scoop, 13. Should it so happen that the left-over screws cannot be evenly balanced by the removal of the pans or trays of screws intact from the bail, 12, it will be found necessary to remove a portion of the screws from pan A in order to make the scale balance; and when this is necessary, the remaining screws in the tray from which they were taken, will be counted and the result added to the amount remaining in the pans, whereby the number of screws in the scoop 13 will be ascertained. The weight of the screws thus left over will be found by means of weights on the shelf, 14, of the bail, 10, as hereinbefore described. In removing the pans or trays of screws from the bail, 12, in order to make the smaller quantity in the scoop, 13, balance, the screws in said removed pan are emptied therefrom into the corresponding pan of the stationary stand shown in Fig. 3 of the drawing, after which the emptied tray from the bail 12 is replaced, preferably in an inverted position. The screws when thus removed will be kept separated and may be readily replaced in the trays of the bail 12 when desired.

The stand shown in Fig. 3 of the drawings comprises a base, 16, to which is secured a bail, 17, having arranged therein a series of shelves, 18, which are lettered to correspond with the shelves, 15, in the bail, 12, and are adapted to contain a set of supplemental trays or pans, 19, which correspond in size with and are lettered and marked the same as the trays or pans, 15′, in the bail 12 of the scale.

Should it be desired to use the scale for counting goods in lots of specified numbers, such, for instance, as lots of one or more dozens, gross, or any other number, one lot containing this quantity will be first counted into one of the pans or trays in the bail, 12, and this quantity will then serve as the unit of weight by which all the other lots to contain the same quantity or number are weighed, the subsequent lots being placed in the scoop, 13, of the bail, 10.

By providing the pans or trays in the bail 12 with numbers which increase on each consecutive tray at the rate of one hundred per cent., and by having different series of numbers on the different sides or edges of the trays, the quantities being counted may be readily ascertained at any desired point in the operation. The bail 12 is adapted to be turned to bring the different sides of the tray to the front of the scale, provision being made for supporting the bail in different positions on the end of the scale beam. In the present instance right-angularly arranged hooks are shown as being provided for this purpose.

Having thus described my invention, what I claim as new and desire to secure by Letters-Patent, is:

1. In a scale of the character described, a balanced beam, a scoop bail arranged on one end of said beam, means in said bail to receive weights, a tray bail on the opposite end of said beam, and a series of trays arranged in said tray bail, said trays being adapted to receive the goods previously weighed in the scoop, whereby said trays serve as weights for the succeeding weighing operations.

2. In a scale of the character described, a balanced beam, a scoop bail arranged on one end of said beam, a weight shelf in said bail, a tray bail on the opposite end of said beam, a series of tray shelves arranged in said bail, and a series of trays arranged on said shelves, said trays being graduated in size and adapted to receive the goods previously weighed in the scoop after each weighing operation whereby said filled trays serve as balancing weights which increase in weight as each successive scoopful of goods is deposited therein after each weighing operation.

3. In a scale of the character described, a balanced beam, a scoop bail arranged on one end of said beam, a weight shelf in said bail, a tray bail, means to support said tray bail in different positions on the opposite ends of the beam, tray supporting shelves in said bail, a series of graduated measuring trays on said shelves, the capacity of each successive tray being double that of the one next above, whereby the goods weighed in the scoop bail may be transferred to said trays after each weighing operation to enable said goods to serve as mediums of weight for obtaining the weight and number of the goods weighed out in the scoop bail in the succeeding weighing operations.

4. In a scale of the character described, a base having a tubular supporting standard, a pivot post slidably mounted in said standard, means to raise and lower said post, a balanced beam pivotally mounted in the upper end of said post, a scoop bail on one end of said beam, a tray bail on the opposite end thereof, a series of shelves in said bail, a series of graduated trays arranged on said shelves, said trays increasing in size from the upper to the lower tray and adapted to serve as receptacles for the goods weighed in the scoop bail whereby the goods in said tray serves as a proportionately-increasing weight for weighing and determining the number of the goods or articles placed in the scoop at each successive weighing operation.

In testimony whereof I have hereunto set my hand in presence of two subscribing witnesses.

JOHN HENRY SWIHART.

Witnesses:
   JAMES PIPER,
   FRANCES D. PIPER.